Nov. 12, 1968 TOSHIMASA KAIWA 3,411,059
PULSE MOTOR AND CONTROL SYSTEM THEREFOR
Filed April 18, 1966 3 Sheets-Sheet 1
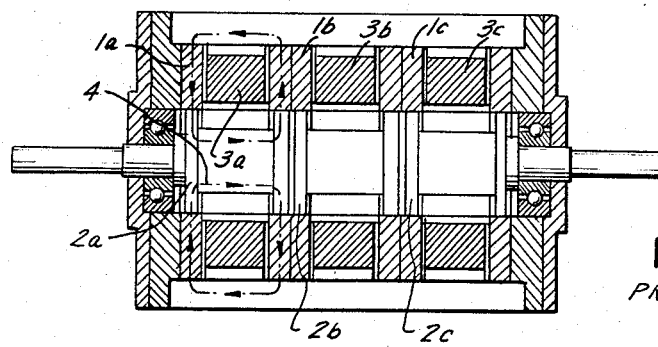
FIG. 1
PRIOR ART
FIG. 3
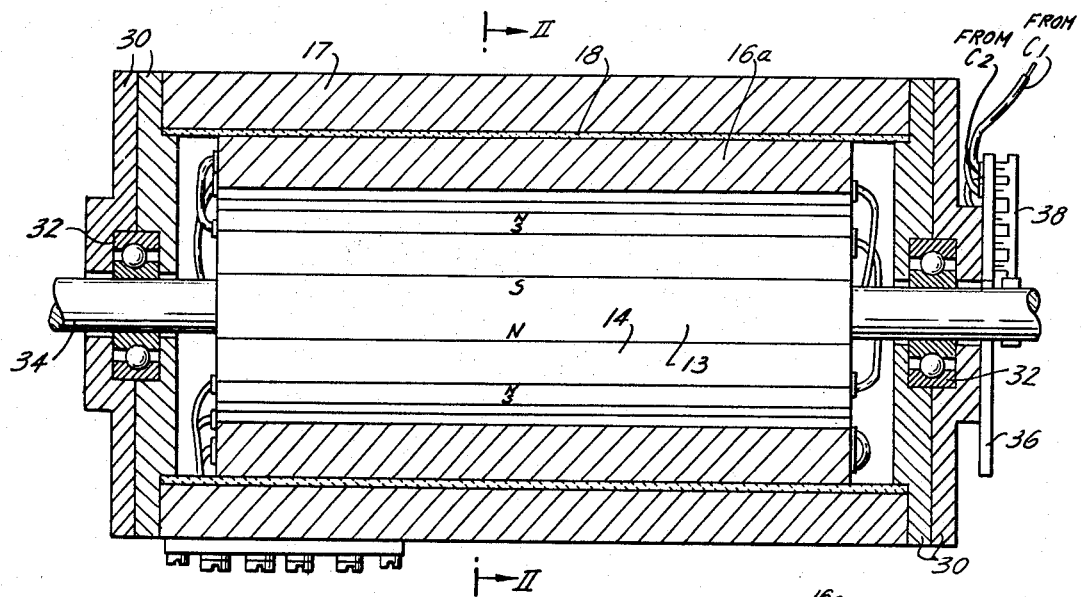
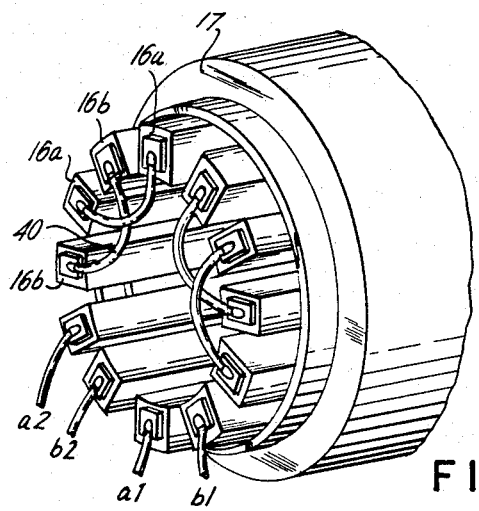
FIG. 4
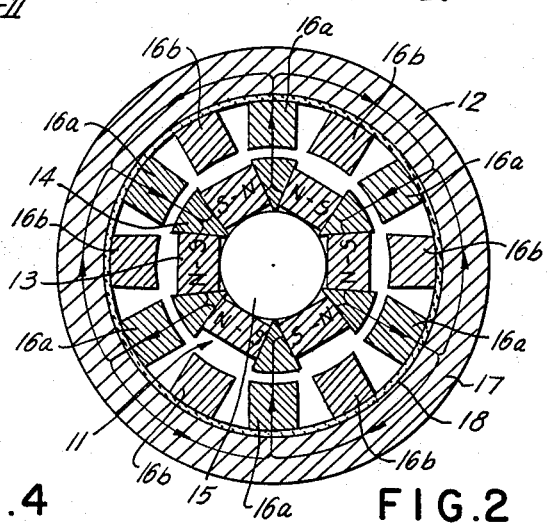
FIG. 2

Nov. 12, 1968        TOSHIMASA KAIWA        3,411,059
PULSE MOTOR AND CONTROL SYSTEM THEREFOR
Filed April 18, 1966                    3 Sheets-Sheet 2

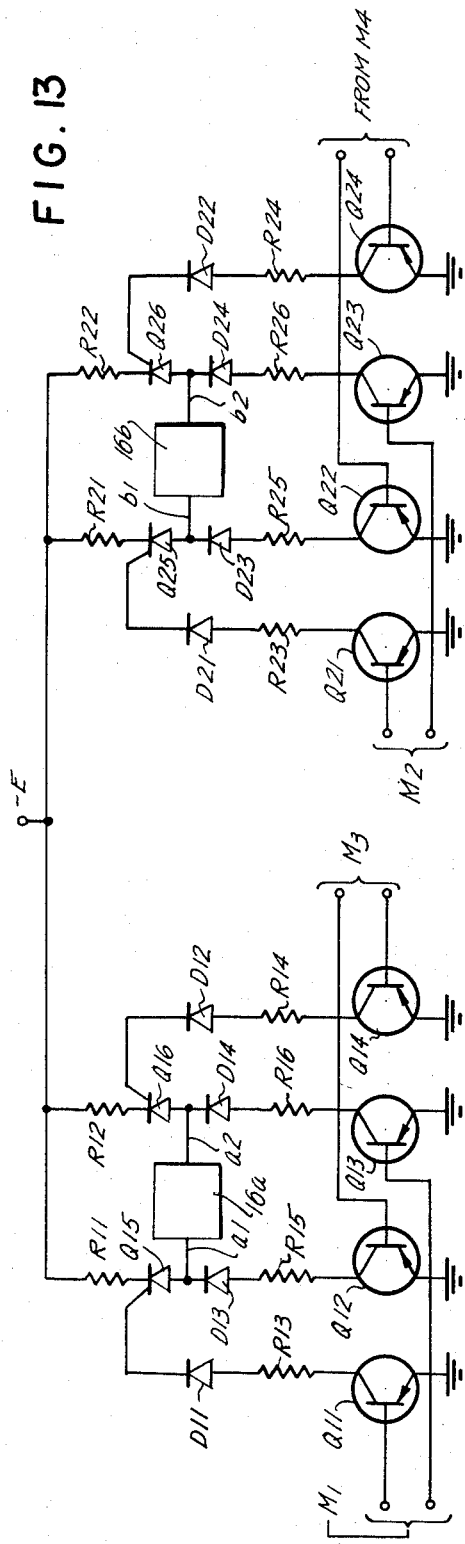
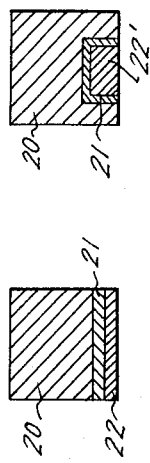
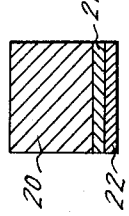
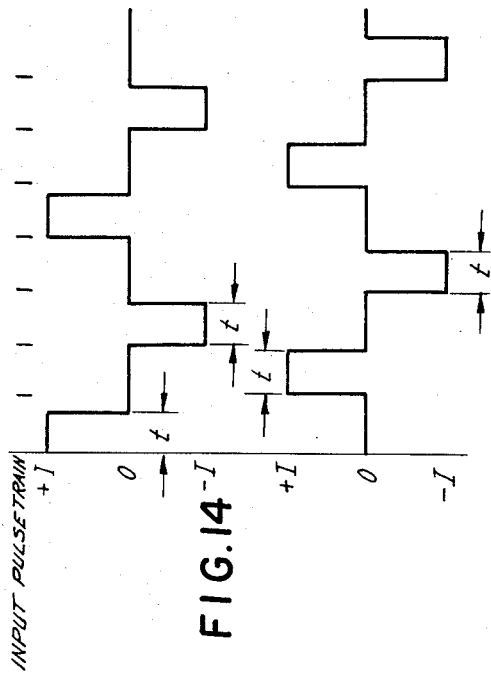
FIG. 13
FIG. 15a  FIG. 15b
FIG. 14

United States Patent Office 3,411,059
Patented Nov. 12, 1968

3,411,059
PULSE MOTOR AND CONTROL SYSTEM THEREFOR
Toshimasa Kaiwa, Kawasaki, Japan, assignor to Fujitsu Limited, Kawasaki, Japan, a corporation of Japan
Filed Apr. 18, 1966, Ser. No. 543,408
Claims priority, application Japan, Apr. 19, 1965, 40/23,121, 40/23,123
7 Claims. (Cl. 318—138)

My invention relates to a pulse motor and more particularly, to a pulse motor having an armature rotatable due to a torque produced by the passage of current through magnetic conductors that are located within magnetic fields, in a direction transverse to the magnetic fields.

Pulse motors of this type—also called step motors—have rotors that are rotatable through an angle proportional to the number of pulses applied to the field coils of the stator of the pulse motor, and are employed, for example, as intermittent feed motors in the input and output devices of computers or as the final stage servomotor in a digital control system.

In a conventional pulse motor of the type disclosed for example in the copending application of S. Inaba et al. entitled, "Switching Circuit for a Plurality of Motors," and bearing application Ser. No. 535,500, filed on Mar. 18, 1966 and assigned to the assignee of the instant application, the armature or rotator is turned through a predetermined angle by applying a voltage and passing a current through a field winding provided in the stator of the motor so as to cause tooth-shaped rotor poles to be attracted magnetically to successive tooth-shaped stator poles. Since the stator winding of such a conventional pulse motor is housed in a yoke of magnetic material which acts as the stator of the motor, a large self-inductance is produced in the motor by the field winding and the magnetic material so that there is a lag in the current rise with respect to the high voltage, resulting in a reduction of efficiency in the starting characteristics of the pulse motor. Furthermore, in order to prevent the rotor from continuing to rotate when the excitation current is cut off, it has been found necessary to apply a mechanical braking force to it.

It is accordingly an object of my invention to provide a pulse motor which avoids the aforementioned difficulties of the conventional pulse motors.

It is another object of my invention to provide a pulse motor which will minimize the lag of current rise with respect to applied voltage caused by self-inductance, and thereby improve the starting characteristics of the pulse motor.

It is a further object of my invention to provide a pulse motor whose rotor will stop rotating immediately when the field winding excitation coil currents are cut off, and which will not require mechanical braking devices to prevent it from turning any further.

The features of my invention which are considered as characteristic for the invention are set forth in the appended claims. Although the invention has been illustrated and described herein as embodied in pulse motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of a specific embodiment when read in connection with the accompanying drawings, in which:

FIG. 1 is a longitudinal sectional view of a prior art pulse motor presented for the purpose of comparison with the motor of the invention in the instant application;

FIG. 2 is a cross-sectional view taken along the line II—II in FIG. 3 of a pulse motor constructed in accordance with the invention of this application;

FIG. 3 is a longitudinal sectional view of the pulse motor of FIG. 2;

FIG. 4 is a perspective view of an end portion of the motor of FIG. 3 with the end plates and rotor removed;

FIG. 13 is a diagram of a portion of the circuit for driving the pulse motor, showing a pulse generator and several monostable multivibrators;

FIG. 14 is a current-time graph showing the wave forms of the pulses applied to the stator poles; and FIGS. 15a and b are diagrammatical cross-sectional views of two different embodiments of the stator pole of the pulse motor constructed in accordance with the invention of the instant application.

Figure 5:
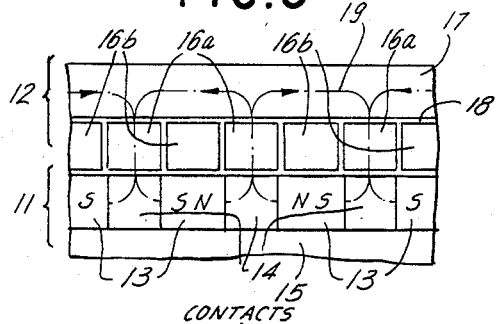
FIGS. 5 through 9 are diagrammatic developed views of portions of the rotor and stator, showing the operation of the pulse motor of the instant application.

Referring now to the drawings and first, particularly to FIG. 1 thereof, there is shown a pulse motor known in the prior art which is of the three-phase stepping type. The stator 1 of a magnetic material, such as soft iron for example, is provided with three field windings 3a, b and c, axially aligned and surrounding a rotor or armature 2. As aforementioned, a motor of the type shown in FIG. 1 is disclosed in copending patent application to S. Inaba et al under Ser. No. 535,500, filed on Mar. 18, 1966. The stator 1 is provided with circumferentially disposed sets of teeth 1a, 1b, 1c surrounding respective circumferential arrays of rotor teeth 2a, 2b, 2c. When the winding 3a, for example, is excited by a current, magnetic flux represented by the dot-dash lines 4 is generated and passes through the stator 1 and the rotor 2. The rotor tooth closest to the stator tooth of opposite charge is attracted thereto and the rotor 2 is caused to turn through a predetermined rotary angle. As the rotor 2 turns due to the force of attraction between the respective stator and rotor teeth, a self-inductance is then impressed on the magnetic material of the surrounding stator 1 and in the field winding 3a, creating a current therein which opposes the excitation current and thereby disadvantageously affects the starting and stopping characteristics of the motor.

FIG. 2 is a cross-sectional view of an embodiment of a pulse motor constructed in accordance with my invention. As shown in FIG. 2, a rotor or armature 11 circumferentially surrounded by a stator 12 is provided with poles 13 formed of permanent magnets and located along the periphery of the rotor 11. Intermediate the permanent magnet poles 13 of the rotor, along the periphery thereof, there are provided rotor poles 14 consisting of magnetic materials such as soft iron, for example. The rotor shaft 15 consists of non-magnetic material. The permanent magnet poles are located with respect to one another so that the North pole for example of each of the permanent magnet poles faces toward the North pole of the next permanent magnet pole 13 separated therefrom by the respective pole 14 of magnetic material. Similarly, the South pole of each permanent magnet pole 13 faces toward the South pole of the next permanent magnet pole 13, but separated by a pole 14 of magnetic material from one another. Stator poles 16a and 16b are shown in FIG. 2 and, although they are both of the same construction and of the same type of material, they have nevertheless been assigned different reference numerals for a purpose hereinafter clearly discernible. The stator poles 16a and 16b are located alternately in a circle around the rotor 11 and have pole faces of substantially the same width and area as the pole faces of the permanent magnet poles 3 and the magnetic material poles 4 of the rotor 11, the pole faces of the stator 12 and the pole faces of the rotor 11 being spaced a very slight distance from one another. The stator poles 16a and 16b consist of electrically conductive magnetic material and are secured to the yoke 17 of the stator 12 in a suitable manner though separated therefrom by an insulating layer 18.

A longitudinal view of the pulse motor of FIG. 2 is shown in FIG. 3 wherein the elongated stator and rotor poles are mounted in a tubular casing 17 provided with suitable end plates 30 at the ends thereof, the end plate at both ends of the casing 17 carrying a roller bearing 32 in which the shaft 34 of the rotor 11 is rotatably mounted. A detector device or code selector plate 36 is fixed to one face of an end plate 30 and has a construction and function which will be more clearly described hereinafter with regard to FIG. 12. A brush 38 having a plurality of aligned contacts is secured to the shaft 34 and extends in a direction transverse to the axis of the shaft 34 so that the contacts thereof come into engagement with suitable electrical contacting surfaces $C_0$ to $C_4$ (FIG. 11) on the code selector plate 36.

In FIG. 4, which is a perspective view of a fragment of the motor of FIG. 3 at one end of the casing with the end plates 30 and the rotor 11 removed, alternate stator poles 16a are shown connected by insulated wires 40 and alternate stator poles 16b are similarly connected by insulated wires 40. The ends of the wires 40 are soldered in a suitable manner to the respective stator poles. Leads $a_1$ and $a_2$ provide current to the conductive stator poles 16a and leads $b_1$ and $b_2$ provide current to the conductive stator poles 16b in a manner described more fully herein with regard to FIGS. 10 and 11.

The operation of the pulse motor of this invention will be understood more clearly when described with reference to FIGS. 5 to 9 which are diagrammatic developed views of a portion of the motor. As seen in FIG. 5, when no current is flowing to the stator, magnetic fluxes 19 produced by the permanent magnet rotor poles 13 complete a magnetic circuit passing through the rotor poles 14 consisting of magnetic material and lying adjacent to the permanent magnet rotor poles 13, the stator poles 16a facing the permanent magnet poles 14 and the yoke 17 of the stator. Thus in the configuration shown in FIG. 5, no relative movement occurs between the rotor 11 and the stator 12.

Figure 6:
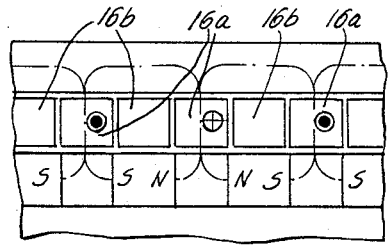
Figure 7:
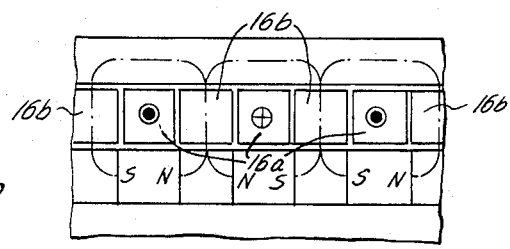
Figure 8:
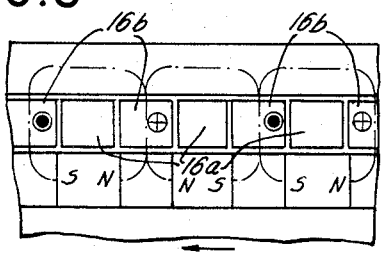

In order to cause the rotor 11 to move a distance corresponding to the width of one of the stator or rotor poles in the direction of the arrow shown at the bottom of FIG. 6, current can be passed only through the stator poles 16a in the direction shown diagrammatically in FIG. 6 wherein the dot with the concentric circle signifies current flow in a direction out of the paper and towards the viewer whereas the cross with the concentric circle signifies current flow in the opposite direction. Thus, when electric current flows through the stator poles 16a transversely to the direction of the magnetic flux generated by the permanent magnet rotor poles, as shown in FIG. 6, a force is produced in accordance with Fleming's left-hand rule which acts on the stator pole 16a to attract the adjacent rotor pole 13 and thereby move the rotor 11 in the direction indicated by the arrow at the bottom of FIG. 6 in the nature of a reaction to that force. When the rotor as shown in FIG. 6 moves a distance equal to the width of one stator pole in the direction of the arrow at the bottom of that figure, the relationship of the rotor to the stator will then be as shown in FIG. 7 wherein as in FIG. 5 there is again no unbalanced force applied to the rotor and the relationship of the rotor and stator to one another remains fixed. Even if the current to the stator poles 16a is then cut off, the relative positions of the rotor and stator as shown in FIG. 7 remain the same and there is no movement between them. If the current is in fact cut off, the same conditions hold for the motor as shown in FIG. 7 as for the motor as shown in FIG. 5, since in FIG 7 the magnetic poles of the permanent magnet rotor poles 13 exert a balanced force on the pole faces of the stator poles 16b and consequently do not move with respect thereto.

Figure 9:
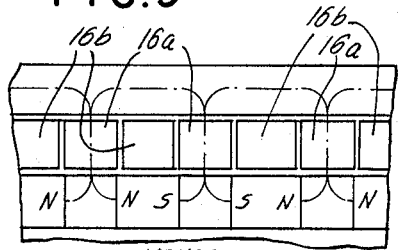

If current is then passed through the stator poles 16b in the directions indicated diagrammatically in FIG. 8, the rotor again moves toward the left hand side of FIG. 8, as indicated by the arrow at the bottom of the figure, a distance corresponding to the width of one of the stator poles 16a, 16b, and when the electric current to the stator poles 16b is then cut off, the rotor has the relationship to the stator as shown in FIG. 9, wherein there is no movement therebetween.

As can be now visualized, the rotation of the rotor is produced by alternately energizing the stator rotor poles 16a and 16b, thereby incrementally advancing the rotor in one rotary direction by a distance equal to the width of one stator pole for each pulsation of current through the respective groups of stator poles 16a and 16b.

Figure 10:
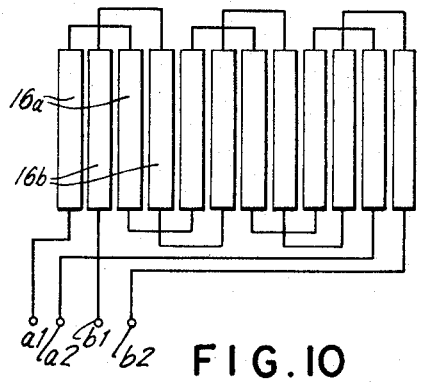
FIG. 10 is a diagrammatic developed view of the stator poles and their electrical interconnection.

A development in one plane of the stator poles 16a and 16b and a wiring diagram therefor is shown in FIG. 10. Each group of respective stator poles 16a and 16b is electrically connected in series so that when energized by an electric current, the current flow will be in opposite directions for the adjacent poles 16a and 16b. The pulse motor constructed in accordance with my invention can consequently be turned in a specific direction by first supplying current to the stator poles 16a in a particular flow direction, then passing current through the stator poles 16b in the same flow direction, thereafter passing current through the poles 16a in an opposite flow direction, followed by passing current through poles 16b in that opposite flow direction. The pulses to the stator poles 16a are supplied thereto through the lead connections $a_1$, $a_2$ and the pulses to the stator poles 16b are supplied through the lead connections $b_1$, $b_2$.

Figure 11:
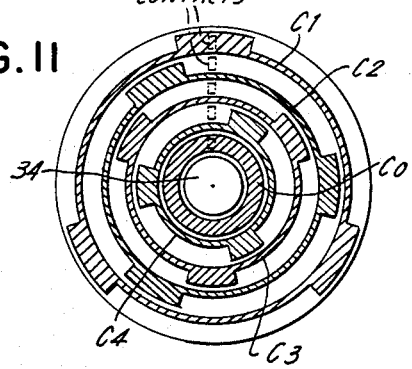
FIG. 11 is a schematic diagram of a circuit employed for driving the pulse motor of the invention in this application.

In FIG. 11 there is illustrated a front view of the detector device or code selector plate shown at the right hand side of FIG. 3. Also shown in phantom view are the contacts of the brush 38 that is fixed to the shaft 34 as shown in FIG. 3. When the shaft 34 rotates counterclockwise, for example, as seen in FIG. 11, the radially outermost contact of the brush will engage an electrically contacting surface $C_1$ of the code selector plate and as the brush sweeps across an arc of 120° the next succeeding radially inwardly located contacts will engage the corresponding contacting surfaces $C_2$, $C_3$, and $C_4$ of the code selector plate. The contacting surfaces on the code selector plate are so distributed that only one of the brush contacts is in engagement at any one time with one of the contacting surfaces $C_1$ to $C_4$. At all times, however, a radially inwardmost brush contact always remains in sliding electrical engagement with an annular contacting surface $C_0$ of the code selector plate which provides a common connection for all of the brush contacts.

After passing through a rotary angle of 120°, the sequence of engagement between the contacts of the brush 38 and the contacting surfaces $C_1$ to $C_4$ of the code selector plate 36 is repeated over another rotary angle of 120° and thereafter once again over a final rotary angle of 120° until a full rotation is completed. Naturally, the rotations continue as long as current is supplied to the stator poles 16a, 16b so that there is a continuous sequence of contacts between the brush and the code selector plate. The position of the rotor is thus determined by the particular location of the brush contacts with respect to the contacting surfaces $C_1$ to $C_4$ on the code selector plate, since the flow of current to the stator poles 16a and 16b and the direction of current flow is determined thereby.

Figure 12:
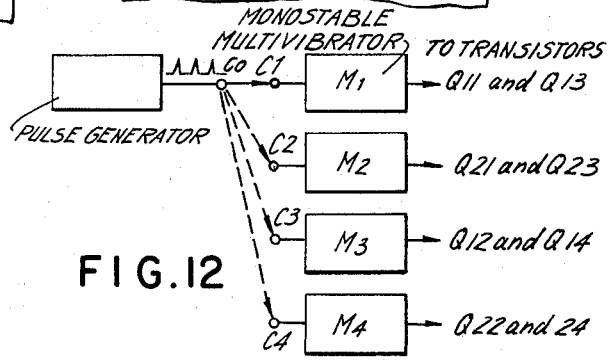
FIG. 12 is a diagrammatic view of a detector or code distribution plate for detecting or determining the angular position of the pulse motor rotor.

In order to rotate the rotor 11 of the pulse motor, pulses generated by a pulse generator PG of conventional construction are applied to the contact element $C_0$, as shown diagrammatically in FIG. 12, and are successively passed through the contacts of the brush 38 to the contacting surfaces $C_1$, $C_2$, $C_3$, $C_4$ and, by means of the leads shown for example in FIG. 3, are conducted to respective monostable multivibrators $M_1$, $M_2$, $M_3$, $M_4$ respectively, which are of conventional construction. From the multivibrators, a signal is fed to the pairs of transistors listed in FIG. 12 and shown in the circuit diagram of FIG. 13. The monostable vibrators, when subjected to the pulses from the contact elements $C_1$ to $C_4$, supply negative pulses of constant width $t$ to the respective pairs of transistors Q11 and Q13, Q12 and Q14, Q21 and Q23, and Q22 and Q24. The width of the pulse $t$ represents the time which is necessary and sufficient for rotating the rotor 11 through a distance corresponding to the width of a stator pole 16a, 16b. In the embodiment disclosed in this application, the monostable multivibrators are employed to prevent current flow when the rotor is not rotating.

FIG. 13 is a schematic diagram of the pulse motor driving circuit providing the alternate flow of current to the stator poles 16a and 16b respectively in the manner aforedescribed with respect to FIGS. 5 through 10. When only the transistors Q11 and Q13 have received a pulse from the monostable multivibrator $M_1$, current then flows through the transistor Q13, the resistor R16, the diode D14, the stator poles 16a, the silicon control rectifier Q15 and the resistor R11. If, however, the resistors Q12 and Q14 are energized by the monostable multivibrator $M_3$ only, current flows through the transistor Q12, the resistor R15, the diode D13, the stator poles 16a, the silicon controlled rectifier Q16 and the resistor R12. Thus, when the brush contacts respectively engage the contact surfaces $C_1$ and $C_3$, the respective monostable multivibrators $M_1$ and $M_3$ cause current to flow through the stator poles 16a in one direction for the multivibrator $M_1$ and in the exact opposite direction for the multivibrator $M_3$.

The circuitry on the right branch in FIG. 13 which supplies current to the stator poles 16b is virtually the same as for the circuitry on the left hand side as described above. In the case of the right hand branch of the circuit in FIG. 13 the monostable multivibrator $M_2$ is connected with the transistors Q21 and Q23 while the monostable multivibrator $M_4$ is connected to the transistor Q22 and Q24.

Assuming, for example, that the brush 38 is in the position illustrated in FIG. 11 wherein the radially outermost contact thereof is in engagement with the contacting surface $C_1$, a pulse generated by the pulse generator PG, shown in FIG. 12, is passed through the contact element $C_1$ and the monostable multivibrator circuit $M_1$ thereby rendering transistors Q11 and Q13 (FIG. 13) active for a period $t$ so that a pulse of electric current flows for a duration of time $t$ through the stator poles 16a as shown at the left hand side of the upper waveform in FIG. 14, thereby turning the rotor 11 of the pulse motor a distance corresponding to the thickness or width of one stator pole 16a, 16b. The turning of the rotor then causes the brush 38 also to move through a rotary angle until the next radially outermost contact thereof engages the contacting surface $C_2$ of the code selector plate 36, thereby electrically connecting the common contacting surface or contact element $C_0$ with the contacting surface $C_2$. As shown in FIG. 12, the pulse generated by the pulse generator PG then passes through the contacting surface $C_2$ to the monostable multivibrator $M_2$ and from there to the base of the transistors Q21 and Q23, making these transistors active for a period $t$ during which a pulse, as shown on the left hand side of the lower waveform of FIG. 14, is passed through the stator poles 16b. In the latter case the current pulse passes through the transistor Q23, the resistor R26, the diode D24, the silicon control rectifier Q25 and the resistor R21 in its path through the stator poles 16b, and accordingly turns the rotor 11 through another brief distance corresponding to the width of a stator pole. It can be seen from FIG. 14 that in both of the foregoing pulses positive current is supplied so that the current flow through the respective adjacent stator poles 16a and 16b is in the same direction. Thereafter the pulse generator in succession passes a negative pulse of duration $t$, as shown in FIG. 14, to the monostable multivibrators $M_3$ and $M_4$ which respectively activate transistors Q12 and Q14 on the one hand and Q22 and Q24 on the other hand so that a pulse current in each of those cases flows through the respective stator poles 16a and 16b in a direction opposite to the direction of flow resulting from the aforementioned pulses from the multivibrators $M_1$ and $M_2$.

The negative pulses from the multivibrators $M_3$ and $M_4$ also cause the rotor 11 to turn respectively through a distance corresponding to the width of one of the stator poles.

As shown in FIG. 14, the sequence of pulses is then repeated so that the overall effect of the pulses is to produce the flow of magnetic flux and the movement of the rotor relative to the stator as shown in FIGS 5 through 9 and as described hereinbefore with respect to those figures.

Two different embodiments of stator poles forming part of the invention of the instant application are shown respectively in FIGS. 15a and 15b. In FIG. 15a there is shown a stator pole having a main portion 20 of magnetic material and a plate 22 of electrically conductive material such as copper, for example, the magnetic material portion 20 and the plate 22 sandwiching between them a layer of insulating material 21. In FIG. 15b, the portion 20 of the stator pole which is of magnetic material is provided with a groove at a central location thereof which is coated with a layer 21 of insulating material, and a rod 22' of electrically conductive material such as copper, for example, is inserted in the groove with the insulating material located between the rod 22' and the magnetic material portion 20. As can be seen clearly in FIG. 15b, the magnetic material portion 20 extends on both sides of the rod 22' so that at least a portion of the magnetic material is located at each side of the stator pole. Thus the insulated wire 40 (FIG. 4) can be readily connected by the soldered portion to either the conductor 22 of the stator pole in FIG. 15a or conductor 22' of the stator pole in FIG. 15b.

I claim:

1. Pulse motor comprising a rotor member and a stator member, each of said members having a plurality of poles arranged in coaxial circles, at least some of the poles of one of said members being formed at least partly of magnetic material and being electrically conductive, means for producing a magnetic field in the poles formed with magnetic material, and means for passing a current through the poles formed with magnetic material in a direction transverse to said magnetic field whereby a torque is applied to said rotor member for turning said rotor member through a predetermined angle.

2. Pulse motor according to claim 1 wherein the poles formed with magnetic material also have an electrically conductive portion, and an insulating layer located between said electrically conductive portion and said magnetic material.

3. Pulse motor according to claim 2 wherein said electrically conductive portion is in the form of a plate and said insulating layer is sandwiched between said plate and said magnetic material.

4. Pulse motor according to claim 2 wherein said magnetic material is formed with an elongated recess, the surface of said recess is coated with said insulating layer, and said electrically conductive portion consists of a rod inserted in said recess.

5. Pulse motor comprising a rotor and a stator, each having a plurality of poles arranged in coaxial circles, the poles of said stator being formed at least partly of magnetic material and being electrically conductive, means for producing a magnetic field in said stator poles, and means for passing a current through said stator poles in a direction transverse to said magnetic field whereby a torque is applied to said rotor for turning it through a predetermined angle.

6. Pulse motor drive system including the pulse motor according to claim 1 and further comprising detecting means for detecting and distributing the current to the poles formed with magnetic material in accordance with the angular position of said rotor member, and driving circuit means connected between said detecting means and the poles formed with magnetic material for passing current reversibly to the poles formed with magnetic material in accordance with said angular position of said rotor member.

7. Pulse motor drive system according to claim 6 wherein the poles formed with magnetic material consist of at least two sets of electrically interconnected poles, the poles of one of said sets being each separated from one another by one of the poles of the other of said sets.

References Cited

UNITED STATES PATENTS

| | | | |
|---|---|---|---|
| 2,627,040 | 1/1953 | Hansen | 310—49 |
| 2,774,922 | 12/1956 | Thomas | 310—49 X |
| 2,982,872 | 5/1961 | Fredrickson | 310—163 |
| 3,165,684 | 1/1965 | Ensink et al. | 318—138 |
| 3,254,286 | 5/1966 | Cunningham | 318—138 |

MILTON O. HIRSHFIELD, *Primary Examiner.*

W. E. RAY, *Assistant Examiner.*